United States Patent [19]
Yazi

[11] Patent Number: 5,350,949
[45] Date of Patent: Sep. 27, 1994

[54] POWER SUPPLY INTERFACE

[75] Inventor: Amar Yazi, Malmö, Sweden

[73] Assignee: Telefonaktiebolaget L M Ericsson, Stockholm, Sweden

[21] Appl. No.: 159,111

[22] Filed: Nov. 30, 1993

Related U.S. Application Data

[63] Continuation of Ser. No. 715,587, Jun. 14, 1991, abandoned.

[51] Int. Cl.⁵ .............................................. H02J 7/00
[52] U.S. Cl. ..................................... 307/150; 307/149
[58] Field of Search ................... 307/149, 150; 320/2; 323/273, 282, 355, 359; 363/124

[56] References Cited

U.S. PATENT DOCUMENTS

| | | | |
|---|---|---|---|
| 3,896,364 | 7/1975 | Reister | 320/2 |
| 4,654,882 | 3/1987 | Ikeda | 455/88 |
| 4,829,224 | 5/1989 | Gandelman et al. | 320/2 |
| 4,831,321 | 5/1989 | Cooper | 320/25 |
| 4,870,698 | 9/1989 | Katsuyama et al. | 455/67 |
| 4,916,729 | 4/1990 | Usui | 379/61 |
| 5,019,767 | 5/1991 | Shirai et al. | 307/150 |
| 5,036,532 | 6/1991 | Metroka et al. | 379/58 |
| 5,121,504 | 6/1992 | Toka | 455/90 |

FOREIGN PATENT DOCUMENTS 2197761 5/1988 United Kingdom.

Primary Examiner—Jeffrey A. Gaffin
Attorney, Agent, or Firm—Burns, Doane, Swecker & Mathis

[57] ABSTRACT

The present invention relates to a power supply interface for a mobile telephone powered from a battery whose terminal voltage is greater than the maximum supply voltage of the mobile telephone. The invention is characterized by a resistive cable (4) which is wound helically and which is connected between an electrical contact (5) on a voltage supply source and an electronic unit mounted in a housing (6). The electronic unit includes a voltage regulator which delivers a controlled output voltage. The resistance of the cable shall exhibit certain conditions and shall have a length which is adapted to the resistance such that when at maximum load the mobile telephone will only be heated to a moderate extent; a maximum temperature of about 50° C., preferably 35° C., is intended.

6 Claims, 1 Drawing Sheet

POWER SUPPLY INTERFACE

This application is a continuation, of application Ser. No. 07/715,587, filed Jun. 14, 1991, now abandoned.

TECHNICAL FIELD

The present invention relates to a power supply interface for a mobile telephone whose supply voltage shall lie between a maximum permitted operating voltage and a minimum permitted operating voltage, for supplying power to the mobile telephone from an external voltage source whose terminal voltage exceeds the maximum permitted operating voltage of the mobile telephone.

BACKGROUND ART

A mobile telephone is normally supplied from a battery incorporated in a housing which may be separate from the hand module of the mobile, or alternatively capable of being inserted thereonto. It is also possible to supply the mobile from a conventional vehicle battery, wherewith the mobile is connected, for example, to the cigarette lighter terminal by means of a separate cable. It is only possible to supply power to the mobile from the cigarette lighter terminal when the voltage of the vehicle battery lies between the maximum and minimum permitted operating voltages.

DISCLOSURE OF THE INVENTION

The object of the present invention is to provide a power supply interface of the aforedescribed kind which will allow the mobile telephone to be powered from an external voltage source whose terminal voltage exceeds the maximum permitted operating voltage of the mobile telephone.

The invention is characterized in that there is used as a voltage lowering element a resistive cable which is connected at one end to the external voltage source and at the other end to an electronic unit which, in turn, is connected directly to the mobile telephone for the purpose of delivering current thereto. The electronic unit includes a voltage regulator. This enables the potential difference between the terminal voltage of the external source and the output voltage of the interface to be divided into two components, namely a voltage drop across the resistive cable and a further voltage drop across the voltage regulator. The voltage drop across the cable Gives rise to ohmic thermal losses, causing the cable to be heated. The voltage drop across the voltage regulator results in heating of the voltage regulator. This enables the power loss to be divided between cable and voltage regulator, thereby enabling the voltage regulator to be made smaller than in a comparative situation when no resistive cable is used.

The thermal losses are concentrated in space, by winding the cable helically.

BEST MODE OF CARRYING OUT THE INVENTION

Figure 1:
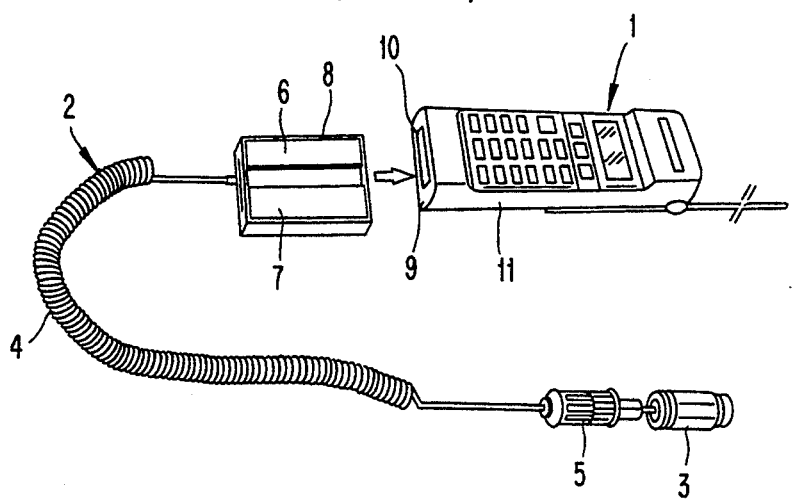
FIG. 1 is a perspective view of an inventive power supply interface and illustrates the use of the interface for supplying power to a mobile telephone from a cigarette lighter terminal.

FIG. 1 illustrates a mobile telephone 1, an inventive power supply interface 2 and a cigarette-lighter terminal 3. The power is normally supplied to the mobile telephone 1 from a battery pack arranged in a housing (not shown) which can be pushed securely onto the rear side of the mobile. The battery housing is provided with conventional spring terminals for connecting the batteries electrically to the electrical circuits of the mobile.

According to the present invention the interface 2 includes a helically wound cable 4 having two ends, of which one is connected to an electrical contact 5 of the cigarette-lighter terminal 3. Attached to the other end of the cable 4 is a housing 6, which accommodates an electric unit described in more detail herebelow with reference to FIG. 2. The housing 6 is provided with elongated ridges 7, 8 intended for insertion into corresponding grooves or slots 9, 10 in the housing 11 of the mobile telephone 1.

Figure 2:
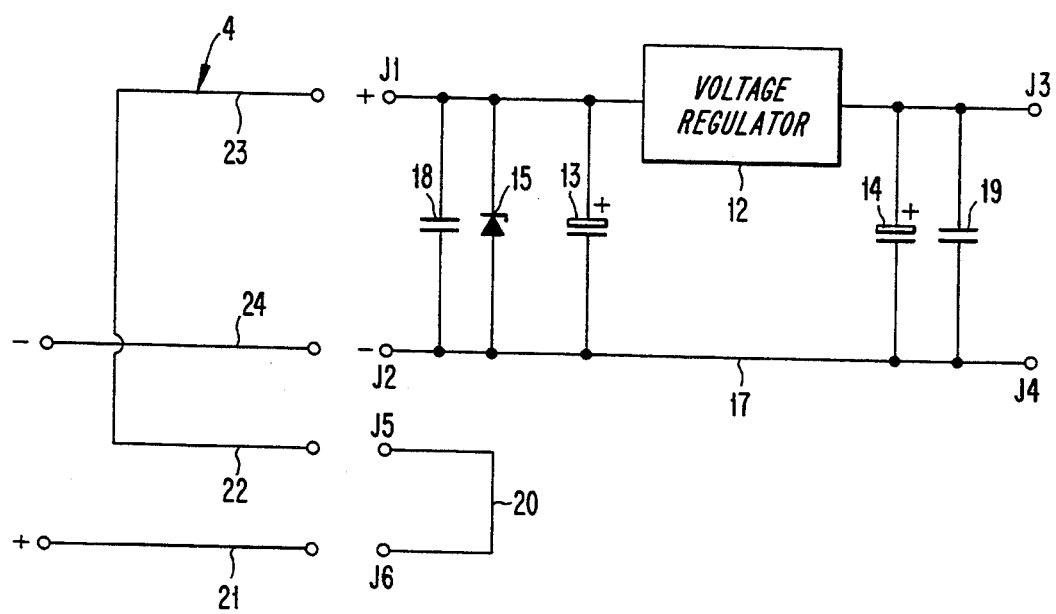
FIG. 2 is a circuit diagram of the electronic unit.

The electronic unit in the housing 6 is mounted on a circuit board (not shown) mounted within the housing. As shown in FIG. 2, the electronic unit includes two input terminals J1 and J2, of which J1 is connected to the positive pole of the external voltage source and the other, J2, is connected to the minus pole of the same voltage source. The terminal J2 is earthed, whereas the terminal J1 is current conducting. The electronic unit also includes two output terminals J3, J4 in the form of spring connectors (not shown) intended for contact with a respective contact plate (not shown) on the mobile housing 11. The output voltage across the terminals J3 and J4 shall lie between the maximum and minimum permitted operating voltage of the mobile, despite the fact that the input voltage across the terminals J1 and J2 may be higher than the maximum permitted operating voltage, said input voltage being equal to the terminal voltage of the external voltage source reduced by the potential drop in the resistive cable. An earth cable 17 extends between the terminals J2 and J4. The heart of the electronic unit is a voltage regulator 12 having an input which is connected to the input terminal J1 and an output which is connected to the output terminal J3. The voltage regulator 12 has the form of an integrated circuit which must be equipped with capacitors 13 and 14 in order to function as a voltage regulator. A zener diode 15 is connected in the illustrated manner between the input of the voltage regulator and the earth cable 17, functioning as a so-called transorber for restricting the amplitude of the voltage on the input of the voltage regulator. A capacitor 18 connected between the input terminals J1 and J2 and a similar capacitor 19 connected between the output terminals J3 and J4 function as filters for filtering out so-called spikes in the input and output voltages.

The largest power losses in the power supply interface occur when transmitting from the mobile telephone. According to the invention, the interface shall be dimensioned so that part of the power losses will be absorbed the resistive cable, whereas the remaining, preferably smaller part of said losses is absorbed by the voltage regulator. This will ensure that the components of the electronic unit will only be heated slightly during maximum load and that the major part of the thermal losses occurs in the resistive cable. It is desired to maintain heating of the electronic components to the lowest possible level, in order to avoid the necessity of a separate cooling arrangement or cooling devices in the housing 6. The resistive cable, on the other hand, is exposed to the ambient air and has a large heat-emitting surface, which means that the cable is well suited for the emission of large thermal powers. The resistance and length of the cable are preferably selected so that the cable will not be heated to a temperature at which a person will be burned by the cable when the mobile telephone is used for transmission over a long period of time. Applicant has found it suitable to choose the length and resistance of the cable so that the cable temperature will reach at most body temperature, i.e. 37° C., when transmitting over long time periods.

With this in mind, it is therefore appropriate to dimension the properties of the cable in the following manner:

The cable resistance shall be selected so that when the mobile telephone is subjected to maximum load conditions and therewith draws maximum current, the voltage drop across the cable, calculated with the aid of Ohms' law, is at most equal to the difference between the whole voltage of the external voltage source and the sum of the minimum permitted operating voltage plus the so-called drop-out-voltage of the voltage regulator, i.e. the smallest permitted voltage drop across the regulator in order for the regulator to allow current to pass therethrough. This drop-out-voltage is normally of the order of 0.4–0.5 V. The voltage drop across the cable will preferably be equal to the difference between said terminal voltage and the maximum permitted operating voltage.

The resistivity of the cable, however, must be in relation with the length of the cable, so that the cable will not become heated to an excessive temperature. Instead, the cable should have a low resistivity, so that the cable may have a long length and a large heat-emitting surface. On the other hand, the cable resistance should not be excessively low, such as to obtain a cable of unmanageable length, despite the cable being wound helically. If the cable available has a low resistance such that the cable has an unmanageable length, it is possible to use a multi-conductor cable and to connect some of the conductors in series. FIG. 2 illustrates a method of coupling the electronic unit when the cable 2 comprises four conductors, here referenced 21, 22, 23 and 24.

Three of the cable conductors, more specifically the conductors 21, 22, 23, are mutually connected in series and one end of the series-combination is connected to the positive terminal of the external voltage source whereas the other end of said series-combination is connected to the input terminal J1. The fourth conductor 24 of the cable extends between the negative terminal of the external voltage source and the earth conductor 17 of the electronic unit. This increases the resistance of a given interface length by a factor of three.

This series connection of the three cable conductors 21–23 can be achieved by soldering the conductors 22 and 23 together at one end of the cable while connecting together the cables 21 and 22 at the other end of said cable by means of a strap 20 such as to mutually connect electrically two input terminals J5 and J6.

Alternatively, the conductors 21 and 22 at said other end of the cable 3 can be shortcircuited against each other, for instance by soldering said conductor ends, instead of using the strap 20.

The voltage regulator must always be dimensioned so that the voltage drop to be lowered, i.e. the terminal voltage minus the sum of the voltage drop across the cable plus the drop-out-voltage of the regulator, calculated on the maximum operating current after multiplying by the maximum operating current, lies beneath the maximum rated output of the voltage regulator, i.e. the power loss induced through the voltage regulator per unit of time.

As an example of the application of an inventive power supply interface it can be mentioned that the battery of an automobile delivers a voltage which varies between 11 and 15 V d.c. voltage. The mobile telephone has a maximum operating voltage of 8.0 V and a minimum operating voltage of 5.3 V. The maximum operating current of the mobile telephone is 800 milliampere. Its minimum operating current is about 60 milliampere. The resistive cable has a length which typically lies between 2.8 m and 3.5 m, depending on the tolerances in the cable resistance. The cable is wound helically to a typical length of about 40 cm. The cable includes four conductors, each having a resistance of 3.25 Ohms. Only two conductors are used, namely an earth conductor and a current conductor. The total cable resistance is thus 6.5 Ohms. The voltage regulator used is an LM 2940-8 type regulator and is connected to deliver a controlled output voltage of 8.0 V. Continuous transmission over a period of 20 minutes resulted in a scarcely noticeable heating of the cable from room temperature, about 18° C., to about 35° C. No noticeable heating of the cable was observed when transmitting over shorter periods. The battery used was a conventional 12 V battery.

It will be understood that the described embodiment can be modified within the scope of the following claims.

I claim:

1. A power supply adapter for a mobile telephone unit having an operating voltage range between a maximum and a minimum operating voltage, said power supply adapter comprising:

a cable having two ends, one end being connected to an external voltage source supplying power to the mobile telephone unit, the terminal voltage of said external voltage source being higher than the maximum operating voltage, and the other end being connected to a voltage regulator unit delivering a controlled output voltage within the permitted operating voltage range, said voltage regulator unit being provided in a housing adapted to be connected to the mobile telephone unit, wherein said cable is a resistive cable the resistance and length thereof being such that when the mobile telephone is subjected to a maximum load over extended periods a major part of the power losses arising from the voltage to be dropped by the cable and the voltage regulator will be absorbed by the resistive cable and the remaining power losses are absorbed by the voltage regulator.

2. A power supply interface for a mobile telephone unit in accordance with claim 1, wherein the cable includes four conductors, three of said conductors being connected in series so as to increase the resistance of the cable for a given length of the cable, and the fourth conductor serving as a return conductor.

3. A power supply interface for a mobile telephone unit in accordance with claim 2, wherein the cable is wound into a helix so to increase the heat dissipation surface.

4. A power supply interface for a mobile telephone unit in accordance with claim 3, wherein the voltage regulator is so selected that any voltage drop which remains to be lowered minus the sum of the voltage drop across the cable and the drop-out-voltage of the voltage regulator multiplied by the maximum current will lie beneath the maximum rated power of the voltage regulator.

5. A power supply interface for a mobile telephone unit in accordance with claim 4, wherein the cable resistance is selected such that the voltage drop across the cable when the mobile telephone unit is subjected to conditions of maximum load, and therewith draws maximum current, is at most equal to the difference between the terminal voltage of the external voltage source and the sum of the minimum permitted operating voltage and the drop-out voltage of the voltage regulator.

6. A power supply interface for a mobile telephone unit in accordance with claim 4, wherein the external temperature of the cable does not exceed 50° C.

* * * * *